United States Patent
Li et al.

(10) Patent No.: US 10,689,518 B2
(45) Date of Patent: Jun. 23, 2020

(54) COLORED EFFECT PIGMENTS

(71) Applicant: Merck Patent GmbH, Darmstadt (DE)

(72) Inventors: Bangyin Li, Fukushima-Ken (JP); Nobuaki Nakamura, Fukushima-Ken (JP); Kaoru Koyama, Iwaki (JP)

(73) Assignee: Merck Patent GmbH, Darmstadt (DE)

( * ) Notice: Subject to any disclaimer, the term of this patent is extended or adjusted under 35 U.S.C. 154(b) by 251 days.

(21) Appl. No.: 15/328,999

(22) PCT Filed: Jun. 29, 2015

(86) PCT No.: PCT/EP2015/001310
§ 371 (c)(1),
(2) Date: Jan. 25, 2017

(87) PCT Pub. No.: WO2016/012074
PCT Pub. Date: Jan. 28, 2016

(65) Prior Publication Data
US 2017/0210905 A1    Jul. 27, 2017

(30) Foreign Application Priority Data
Jul. 25, 2014    (EP) ..................... 14002590

(51) Int. Cl.
*C09C 1/00*    (2006.01)
*C09D 7/60*    (2018.01)
(Continued)

(52) U.S. Cl.
CPC .............. *C09C 1/0078* (2013.01); *C09C 1/62* (2013.01); *C09C 1/648* (2013.01); *C09C 1/66* (2013.01); *C09D 5/002* (2013.01); *C09D 7/60* (2018.01); *C09D 7/61* (2018.01); *C09D 7/62* (2018.01); *C09D 7/70* (2018.01); *C09D 11/50* (2013.01); *C01P 2004/20* (2013.01);
(Continued)

(58) Field of Classification Search
None
See application file for complete search history.

(56) References Cited

U.S. PATENT DOCUMENTS 2,885,366 A    5/1959    Iler
3,954,496 A    5/1976    Batzar
(Continued)

FOREIGN PATENT DOCUMENTS

CS    224792 B1    1/1984
DE    19836810 A1    2/2000
(Continued)

OTHER PUBLICATIONS

International Search Report dated Sep. 30, 2015, issued in corresponding PCT/EP2015/001310, 3 pages.
(Continued)

*Primary Examiner* — Colleen P Dunn
*Assistant Examiner* — Ross J Christie
(74) *Attorney, Agent, or Firm* — Millen White Zelano and Branigan, PC; John Sopp

(57) ABSTRACT

The present invention relates to colored effect pigments, in particular to those containing an organic color pigment layer, to a preparation method thereof and to the use of these pigments especially in a composition comprising the colored effect pigments.

28 Claims, 1 Drawing Sheet

(51) Int. Cl.
  *C09D 7/62* (2018.01)
  *C09D 7/61* (2018.01)
  *C09C 1/64* (2006.01)
  *C09C 1/66* (2006.01)
  *C09C 1/62* (2006.01)
  *C09D 5/00* (2006.01)
  *C09D 7/40* (2018.01)
  *C09D 11/50* (2014.01)
  *C08K 3/22* (2006.01)

(52) U.S. Cl.
  CPC ............ *C01P 2006/60* (2013.01); *C08K 3/22* (2013.01); *C09C 2200/1058* (2013.01); *C09C 2220/106* (2013.01)

(56) References Cited

U.S. PATENT DOCUMENTS

| | | | |
|---|---|---|---|
| 4,084,983 | A | 4/1978 | Bernhard et al. |
| 4,755,229 | A | 7/1988 | Armanini |
| 5,156,678 | A | 10/1992 | Glausch |
| 5,474,605 | A | 12/1995 | Schmid et al. |
| 5,505,991 | A | 4/1996 | Schmid et al. |
| 5,607,504 | A * | 3/1997 | Schmid .............. A61K 8/11 106/403 |
| 5,763,086 | A | 6/1998 | Schmid et al. |
| 6,398,861 | B1 | 6/2002 | Knox |
| 6,858,072 | B1 * | 2/2005 | Li ..................... C09C 3/006 106/415 |
| 7,419,538 | B2 | 9/2008 | Li et al. |
| 8,177,901 | B2 | 5/2012 | Bujard et al. |
| 9,499,696 | B2 | 11/2016 | Fujii et al. |
| 2007/0051275 | A1 | 3/2007 | Muller et al. |
| 2008/0314284 | A1 * | 12/2008 | Li ..................... C09C 1/0015 106/31.9 |
| 2010/0183809 | A1 * | 7/2010 | Oyanagi ............... C09C 1/62 106/403 |
| 2011/0025783 | A1 * | 2/2011 | Oyanagi ............. C09C 1/622 106/403 |
| 2011/0118384 | A1 * | 5/2011 | Bugnon ................ C09D 7/70 523/171 |
| 2013/0164529 | A1 * | 6/2013 | Yu ..................... C09C 1/0036 106/287.24 |
| 2015/0071973 | A1 * | 3/2015 | Fujii ................... C09D 7/65 424/401 |

FOREIGN PATENT DOCUMENTS

| | | | |
|---|---|---|---|
| EP | 0708154 A2 * | 4/1996 | ............... A61K 8/11 |
| EP | 0708154 A2 | 4/1996 | |
| JP | H03-74372 A | 3/1991 | |
| JP | H07-292279 A | 11/1995 | |
| JP | 8209024 A | 8/1996 | |
| JP | H08-209024 A | 8/1996 | |
| JP | H08-209025 A | 8/1996 | |
| JP | H08-302237 A | 11/1996 | |
| JP | H09-124971 A | 5/1997 | |
| JP | 2001-502375 A | 2/2001 | |
| JP | 2003-041150 A | 2/2003 | |
| JP | 3581339 B2 | 10/2004 | |
| JP | 2006521463 A | 9/2006 | |
| WO | 14041692 A1 | 3/2014 | |

OTHER PUBLICATIONS

English translation Abstract of JP3581339B2 published Oct. 27, 2004 (2 pages).
English translation Abstract of JP2003041150A published Feb. 13, 2003 (2 pages).
English translation Abstract of JPH08209024A published Aug. 13, 1996 (1 page).
English translation Abstract of JPH08302237A published Nov. 19, 1996 (2 pages).
English translation Abstract of JPH09124971A published May 13, 1997 (2 pages).
English translation Abstract of DE19836810A1 published Feb. 17, 2000 (2 pages).
English translation Abstract of JPH0374372A published Mar. 28, 1991 (2 pages).
English translation Abstract of JP2001502375A published Feb. 20, 2001 (1 page).
English translation Abstract of JPH08209025A published Aug. 13, 1996 (1 page).
English translation Abstract of JPH07292279A published Nov. 7, 1995 (1 page).
English translation Abstract of EP0708154A published Apr. 24, 1996 (1 page).
First office Action in corresponding JP Appln. No. 2017-504056 dispatched Jun. 27, 2019 (pp. 1-4).
Miyahara, S., "Organic Fluorescent Pigments", Phosphor Handbook 2nd Edition, 2006, pp. 769-774.
Ohkura, K. "Organic Pigments (III), Green Pigments, Blue Pigments and Violet Pigments", Shikizai, 1982, vol. 55, No. 11, pp. 829-837.

* cited by examiner

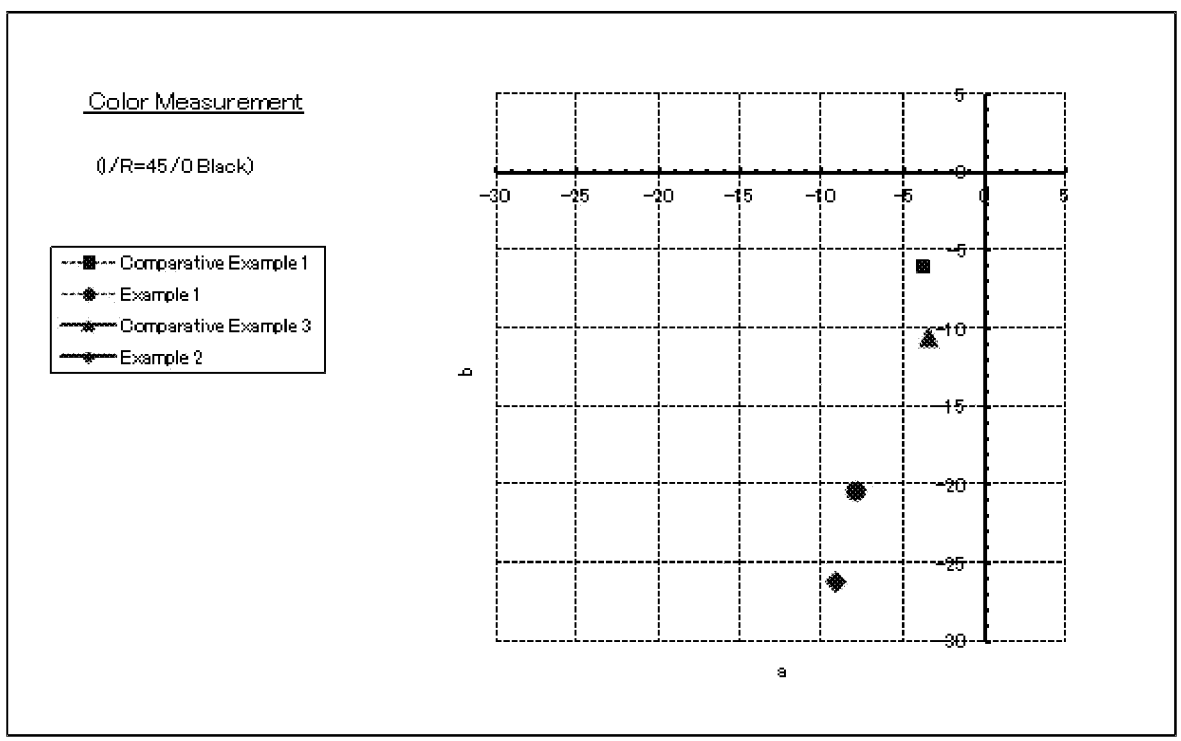

10,689,518 B2

COLORED EFFECT PIGMENTS

FIELD OF THE INVENTION

The present invention relates to colored effect pigments containing an organic color pigment layer and to a preparation method thereof. The invention also relates to use of these colored effect pigment as well as to a composition comprising the colored effect pigments.

BACKGROUND ART

Colored pigments containing at least one layer composed of organic color pigments based on a flaky substrate are known in the prior art per se. Effect pigments containing a layer of organic color pigments wherein the organic color pigments are insoluble in water or in aqueous solutions are difficult to produce by wet chemical processes, since homogeneous color pigment layers might hardly be achieved under such conditions. For example, CS 224792 B1 discloses a process for the production of colored effect pigments, wherein organic color pigments suspended in an aqueous solution are co-deposited with a metal hydroxide onto the surface of a mica pigment.

In U.S. Pat. No. 4,755,229, colored micaceous pigments are described having a layer comprising hydrous oxide or hydroxide of a polyvalent cation, an anionic polymeric substance as well as a water-insoluble colored pigment on the surface of a mica platelet.

U.S. Pat. No. 5,156,678 discloses an effect pigment comprising an interference pigment coated with a phthalocyanine compound, wherein the latter is deposited in a film directly adhering to the interference pigment without a binder system or an auxiliary material.

In U.S. Pat. No. 4,084,983, colored lustreous pigments are described, comprising micaceous flakes coated with an aluminium lake which is fixed to the surface of the micaceous pigment by an intermediate coating of aluminium hydroxide.

PATENT LITERATURE

1. CS 224792 B1
2. U.S. Pat. No. 4,755,229
3. U.S. Pat. No. 5,156,678
4. U.S. Pat. No. 4,084,983
Non Patent Literature

SUMMARY OF THE INVENTION

However, the inventors newly have found that there is still one or more of considerable problems for which improvement is desired, as listed below.
1. A colored effect pigment which shows less bleeding of the organic color pigment layer is desired
2. A colored effect pigment having better tinting strength is needed
3. A colored effect pigment having good chroma is still a need for improvement
4. A colored effect pigment which shows less peeling of the organic color pigment layer is required
5. A new manufacturing method for colored effect pigments having better tinting strength and exhibiting less bleeding of the organic color pigment layer is desired
The inventors aimed to solve one or more of the aforementioned problems.

Surprisingly, the inventors newly have found that colored effect pigments, comprising a flaky metal substrate and at least three layers covering the flaky metal substrate, wherein the at least three layers comprise a layer package composed of layers a, b and c in the following sequence:
(a) a hydrated metal oxide primer layer comprising a hydrated metal oxide;
(b) an organic color pigment layer on layer (a) comprising an organic color pigment; and
(c) a hydrated metal oxide layer on layer (b) comprising a hydrated metal oxide,
solve all pigment related problems of the above mentioned problems at the same time.

In another aspect, the present invention also relates to a manufacturing method for said colored effect pigments, comprising the following steps:
(A) providing a suspension of a flaky metal substrate, optionally coated with
  one or more passivation layers and/or with at least one interference layer, in an aqueous medium;
(B) adding an aqueous solution of metal salt to the suspension prepared in
  step (A) while keeping a prescribed pH value at a value necessary for precipitation of the corresponding hydrated metal oxide on the flaky metal substrate (neutralization point);
(C) decreasing the pH value obtained in step (B) to a range of from 0.2 to 3.0 below the neutralization point of the corresponding hydrated metal oxide;
(D) adding an acidic solution of an organic color pigment to the suspension prepared in step (C), thereby producing an intermediate pigment having a colored surface layer; and
(E) adding an aqueous solution of metal salt to the suspension prepared in step (D) while adjusting the pH value to a value necessary for precipitation of the corresponding hydrated metal oxide (neutralization point) on the colored surface layer of the intermediate pigment obtained in step (D).

In a further aspect, the present invention relates to the use of the colored effect pigments for the coloring of paints, inks, plastic films, plastic shaped bodies, coating compositions, pigment preparations, anticounterfeiting products or cosmetics.

In still another aspect, the present invention also provides a composition comprising the colored effect pigment as disclosed above.

Further advantages of the present invention will become evident from the following detailed description.

BRIEF DESCRIPTION OF DRAWINGS

FIG. 1: shows the results of the color evaluation of the color effect pigments according to example 1 and 2 as well as comparative examples 1 and 3.

DETAILED DESCRIPTION OF THE INVENTION

In a general aspect, the present invention provides a colored effect pigment, comprising a flaky metal substrate, and at least three layers covering the flaky metal substrate, wherein the at least three layers comprise a layer package composed of layers a, b and c in the following sequence:
(a) a hydrated metal oxide primer layer comprising a hydrated metal oxide;
(b) an organic color pigment layer on layer (a) comprising an organic color pigment; and (c) a hydrated metal oxide layer on layer (b) comprising a hydrated metal oxide.

The primer layer (a), which is located on the surface of the flaky metal substrate, the latter may, optionally, be passivated and/or pre-coated as will be described later, comprises a hydrated metal oxide.

For the purpose of the present invention, the term "hydrated metal oxide" shall mean hydrated metal oxides, metal hydroxides, metal oxides bearing hydroxyl groups or mixtures of at least two thereof.

The hydrated metal oxide layer (a) comprising hydrated metal oxides may, in a first embodiment of the present invention, be composed solely of an hydrated metal oxide as defined above or may be, in a further embodiment, be composed of a mixture of an hydrated metal oxide and the organic color pigment which is contained in the organic color pigment layer (b).

In still a further embodiment, the hydrated metal oxide layer (a) is composed in one part of a sole (pure) hydrated metal oxide and, in a second part, of a mixture of the hydrated metal oxide with the organic color pigment which is contained in layer (b). To this end, it is preferred that layer (a) comprises a sublayer (a1) and a sublayer (a2), wherein sublayer (a1) is facing the flaky metal substrate and is composed solely of an hydrated metal oxide, and wherein sublayer (a2) is facing layer (b) and is composed of a mixture of an hydrated metal oxide and the organic color pigment of the organic color pigment layer (b).

According to the present invention, the hydrated metal oxide contained in layer (a) is a hydrated metal oxide of aluminum, zinc, calcium, magnesium, zirconium or cerium. Preferred are hydrated metal oxides of aluminium, calcium or magnesium.

From the viewpoint of ease of procurement availability of the raw materials as well as ease of the production conditions, hydrated metal oxide of aluminium is particularly preferred.

Generally, the whole thickness of layer (a) may be varied as desired. Nevertheless, compared to usually known interference layers in interference effect pigments, the geometrical total thickness of layer (a) is rather small. This is due to the fact that layer (a) acts as a primer layer rather than as an interference layer in the present colored effect pigments.

Preferably, the total thickness of layer (a) is in the range of from 1 to 50 nm. In particular, it is in the range of from 5 to 20 nm.

According to the present invention, the amount of hydrated metal oxide in layer (a), calculated as metal oxide, is in the range of from 0.1 to 20 percent by weight, based on the weight of the flaky metal substrate. Preferably, it is from 0.5 to 5 percent by weight of the flaky metal substrate.

According to the present invention, layer (a) comprises an active site, which is activated by acid treatment. More preferably, the active site is on the upper surface of layer (a), facing layer (b). At this active site, layer (a) is more porous and exhibits higher ionic activity than at its surface facing the flaky substrate. In a preferred embodiment, the active site of layer (a) is identical to sublayer (a2) as described above. The higher porosity as well as the higher ionic activity at the active site is due to the acid treatment which will be described later.

For the purpose of the present invention, the term "activate" means the inducement of forming additional metal cations on the upper surface of the hydrated metal oxides of layer (a), and the term "active site" is defined as excess metal cation site of layer (a). Examples of metal cations are hydroxyl metal cations, oxymetal cations, and/or hydrated metal cations like those described in following formulae (a) to (e) as cations (1) to (5).

$$M(OH)_n + H^+ \rightarrow [M(OH)_{n-1}]^+(1) + H_2O \quad \text{Chemical formula (a)}$$

$$[M(OH)_{n-1}]^+ + H^+ \rightarrow [M(OH)_{n-2}]^{2+}(2) + H_2O \quad \text{Chemical formula (b)}$$

$$[M(OH)_{n-1}]^+ + H^+ \rightarrow [O=M(OH)_{n-4}]^{2+}(3) + 2H_2O \quad \text{Chemical formula (c)}$$

$$[M(OH)]^{(n-1)+} + H^+ \rightarrow M^{n+}(4) + H_2O \quad \text{Chemical formula (d)}$$

$$[M(OH)]^{(n-1)+} + H^+ \rightarrow [M(H_2O)]^{n+}(5) \quad \text{Chemical formula (e)}$$

In formulae (a) to (e), at each occurrence, the symbol M represents a metal element, identically or differently selected from the group consisting of aluminum, zinc, calcium, magnesium, zirconium or cerium; n is integer.

It goes without saying that the number representing n may not be defined here.

Without wishing to be bond by theory, and even though the detailed mechanism is not confirmed yet, it is believed that the generated metal cations of the activated layer (a) may bond to an acid group of organic color pigments, especially, bond to a sulfuric acid group. And it is thought that such bonding between metal cations and acid groups, especially sulfuric acid group and the metal cations of activated hydrated metal oxide in layer (a) may lead to a better adhesion of the organic color pigment contained in layer (b) to layer (a), eventually leading to less peeling and less bleeding of the organic color layer as well as remaining luster with increased color intensity of the resulting color effect pigments according to the present invention.

Preferably, according to the present invention, the organic color pigment for forming layer (b) is insoluble in water. In other words, the organic color pigment which can be used for forming layer (b) is a water insoluble organic color pigment. The type of water insoluble organic color pigment is not particularly limited but needs to have acid solubility. Any type of publically known water insoluble but acid soluble organic color pigment can be used in this way.

Preferably, the organic color pigment can be selected from the group consisting of phthalocyanine (non-metalized phthalocyanine; C.I. Pigment Blue-16), a metal phthalocyanine, an indigo compound such as indigo, indigo blue, and/or indigo carmine, an anthradione compound such as anthraquinone, quinacridone, and a combination of any of these, as soon as the resulting mixture is acid soluble and water insoluble.

In preferred embodiments of the present invention, the organic pigment for forming layer (b) is phthalocyanine or a metal phthalocyanine compound. In a particularly preferred embodiment of the present invention, the metal phthalocyanine can be selected from the group consisting of Cu-phthalocyanine (α, β, γ, δ, ε, ρ, π, χ crystal types or a combination of any of these), other metal phthalocyanine (Ni, Co, V, Al, Mg. Ba, Na, Zn or Sn phthalocyanines), or a Cu-phthalocyanine halides (such as Cl and/or Br substituted Cu-phthalocyanine halide) and a combination of any of these.

The suitable organic color pigment materials described above are well known to the skilled person and mentioned e.g. in the phosphor handbook, $2^{nd}$ edition (CRC Press, 2006), pp. 769-pp. 774 (W. M. Yen, S. Shionoya and H. Yamamoto), Ken Ohkura "Organic pigments (III), Green Pigments, blue Pigments and Violet pigments", Shikizai 55 [11], 829-837, 1982.

In a preferred embodiment of the present invention, layer (b) further comprises sulphur atoms. More preferably, layer (b) comprises sulfuric acid groups. The amount of sulphur atoms can be determined by generally known combustion methods for organic materials.

Preferably, layer (b) is composed of the organic color pigment and, optionally, acid groups, in particular sulfuric acid groups, only. No further components shall be contained in layer (b).

In general, according to the present invention, the thickness of layer (b) is in the range of from 1 to 500 nm. In a preferred embodiment of the present invention, it is in the range of from 5 to 300 nm.

According to the present invention, the amount of the organic color pigment contained in the organic color pigment layer (b) is from 0.1 to 100 percent by weight, based on the weight of the flaky metal substrate.

Preferably, it is from 0.5 to 50 percent by weight of the flaky metal substrate.

According to the present invention, hydrated metal oxide layer (c) which is located on layer (b) comprises at least one type of hydrated metal oxides of elements selected from aluminum, zinc, calcium, magnesium, zirconium, cerium and silicon. It goes without saying that "at least one type" here means one hydrated metal oxide or a mixture or combination of two or more of the materials mentioned above. For the purpose of the present invention, silicon, although exhibiting a semi-metallic character rather than a metallic character, is regarded as metal as well.

Preferably, layer (c) essentially consists of one type or at least two types of hydrated metal oxides of elements selected from aluminum, zinc, calcium, magnesium, zirconium, cerium and silicon. Of these, hydrated metal oxides of aluminium, calcium and magnesium are preferred. From the viewpoint of ease of procurement availability of raw materials, hydrated metal oxide of aluminium is particularly preferred.

Without wishing to be bond by theory, it is believed that layer (c) can prevent peeling of layer (b) and hinders bleeding of the organic color pigment in further processing.

The thickness of layer (c) is not critical per se and may be adjusted due to the desired characteristics of the resulting colored effect pigment. Generally, the thickness should be chosen in the range of from 1 to 500 nm, in particular of from 5 to 300 nm.

In some embodiments of the present invention, optionally, the colored effect pigment can further comprise a protective layer on the outmost surface of the colored effect pigment described above.

Therefore, in a further embodiment of the present invention, at least one protective layer (d) is located on top of layer (c). Protective layer (d) can be one single layer or can be two or more of stacked layers.

According to the present invention, the protective layer may comprise organic and/or inorganic materials, such as hydrated silicon oxides, hydrated cerium oxides, silane coupling agents, polymers, copolymers, or a combination of any of these like for instance described in U.S. Pat. No. 7,419,538 B2.

In case protective layer (d) is composed of one or more inorganic materials, it goes without saying that the inorganic material forming the direct coating layer (d) on top of layer (c) of the colored effect pigment of the present invention is different from the hydrated metal oxide(s) contained in layer (c).

Since the protective layer (d) must not detrimentally influence the color characteristics of the resulting colored effect pigment and is rather applied in order to ease the applicability of the pigment in the desired application medium, the total thickness thereof is preferably adjusted in the range of from 0.1 to 20 nm, in particular in the range of from 0.1 to 10 nm.

The application of protective layers as well as the materials which may be used for this purpose are known very well to the skilled person in the art.

The colored effect pigment according to the present invention is based on a flaky metal substrate.

Preferably, the flaky metal substrate comprises at least one type of metal or alloy selected from aluminum, titanium, gold, silver, iron, copper, zinc, tin, nickel and chromium. Examples of an alloy include, for example, aluminium alloys, iron-chromium-nickel alloys (stainless steels), copper-zinc alloys and copper-tin alloys.

In a particularly preferred embodiment of the present invention, the flaky metal substrate comprises aluminum, aluminum alloys, titanium, stainless steel or a combination of any of these. Still more preferably, the flaky metal substrate is selected from aluminum, aluminum alloys, titanium, stainless steels, of which stable supply is available on the market. Most preferably, the flaky metal substrate is of aluminum or aluminum alloy, since these materials are inexpensive as well as readily available in the market.

The size of the flaky metal substrate is not critical per se. In general, all types of flaky metal substrates which are available in the market, in particular those of the materials as described above, may be used as substrate for the colored effect pigments of the present invention. Preferably, the flaky metal substrates exhibit an average particle size of from 2 to 100 µm and an average thickness of from 0.005 to 5 µm, more preferably an average particle size of from 5 to 50 µm and an average thickness of from 0.01 to 2 µm, and particularly preferably an average size of from 5 to 30 µm and an average thickness of from 0.02 to 2 µm.

In some embodiments of the present invention, optionally, the flaky metal substrate is passivated by one or more passivation layers.

Without wishing to be bond by theory, it is believed that such a passivation layer(s) can prevent reaction of the metal substrate with water, acids, caustic materials and/or oxides.

For some flaky metal substrates, passivation thereof is an indispensable feature in case that further wet coating procedures, contact with aqueous media and the like are desired or necessary. This belongs in particular to the aluminium flake substrates which are preferably used as substrates for the present colored effect pigments.

There are a lot of passivation methods and materials known in the art. Preferably, the one or more passivation layers comprise a hydrated oxide (for example, JP H08-209024A, JP H08-302237A, JP H09-124971A), a phosphonic acid (for example, DE 19836810.0), an organic phosphoric acid (for example, JP H03-74372A, JP 2001-502375 T), silica (for example, JP H08-209025A, U.S. Pat. Nos. 2,885,366B, 3,954,496B), volatile phosphorus compounds and volatile nitrogen containing organosilicon compounds (JP H07-292279A), boric acid compounds or phosphoric acid compounds with one or more of hydrated oxide layers thereon (for example, U.S. Pat. No. 7,419,538B2), or a combination of any of these.

The passivation layer of the present invention can be produced by a well-known process like described in JP H08-209024A, JP H08-302237A, JP H09-124971A, DE 19836810.0, JP H03-74372A, JP 2001-502375 T, JP H08-209025A, U.S. Pat. Nos. 2,885,366, 3,954,496, H07-292279A or U.S. Pat. No. 7,419,538B2)

For the colored effect pigments according to the present invention, passivation layers and a method as described in U.S. Pat. No. 7,419,538B are especially preferred. Therein, highly anti-corrosive flaky metal pigments are disclosed, which are treated on the surface thereof with boric acid compounds or phosphoric acid compounds or both, and thereon one or more layers containing one or more hydrated metal oxides of one or more metals selected from the group consisting of silicon, aluminum, zirconium, titanium and tin. Preferably, silicon and/or aluminium hydrated oxides are used due to their transparency and low reflective index. In particular, hydrated silicon oxide is the most preferable due to ease of handling. The hydrated metal oxides here are applied in particular by using organic precursors thereof, which are applied in a sol/gel method. According to this method, glassy, dense, amorphous inorganic passivation layers may be achieved. Advantageously, the thickness thereof is adjusted in a manner that the passivation layers do not exhibit interference effects.

In some embodiments of the present invention, optionally, the flaky metal substrate is covered with at least one interference layer, either on top of the metal substrate as such or on top of the one or more passivation layers, as the case may be. Interference layers according to the present invention are layers of inorganic materials as described below, which exhibit, on the incidence of light, interference effects on their own and/or in combination with each other, due to their particular refractive indices and thickness.

Preferably, the at least one interference layer comprises one type or more types of metal oxides or hydrated metal oxides, in which the metal elements of metal oxides or hydrated metal oxides are selected from the group consisting of titanium, iron, aluminum, zirconium, cerium, tin, zinc, chromium, cobalt, silicon, boron and a combination of any of these.

More preferably, the at least one interference layer of the present invention, if present, essentially consists of one type or more types of metal oxides or hydrated metal oxides of the elements selected from the group consisting of titanium, iron, aluminum, zirconium, cerium, tin, zinc, chromium, cobalt, silicon and boron. Even more preferably, the interference layer is a titanium oxide layer or hydrated titanium oxide layer in order to realize colorless layers exhibiting good interference effects.

Further interference layer(s) may be present in addition to the titanium oxide layer or hydrated titanium oxid layer, being composed of the materials mentioned above.

In a preferred embodiment of the present invention, optionally, a tin oxide layer or a hydrated tin oxide layer can constitute the first layer onto the passivated or not passivated metal flake substrate, being placed between the (optionally passivated) flaky metal substrate and the first interference layer. Such a hydrated tin oxide layer exhibits, in most cases, not a thickness sufficient for generating interference effects at its own and does not constitute an interference layer by itself. Without wishing to be bond by theory, it is believed that the tin oxide layer or hydrated tin oxide layer may lead to an improvement of the adhesion and compactness between the flaky metal substrate and the interference layer or between the passivation layer of the flaky metal substrate and the interference layer. Furthermore, it is known in the art that hydrated tin oxide or tin oxide can act as a rutilizing means for a subsequently following layer of $TiO_2$. Optionally, further interference layer(s) may be located on top of the titanium oxide layer and hydrated titanium oxide layer, respectively, too.

Manufacturing Method of Colored Effect Pigments

In another aspect, the present invention further relates to a manufacturing method for the colored effect pigment according to the present invention, comprising the following steps:
(A) providing a suspension of a flaky metal substrate, optionally coated with one or more passivation layers and/or with at least one interference layer, in an aqueous medium;
(B) adding an aqueous solution of a metal salt to the suspension prepared in step (A) while keeping a prescribed pH value at a value necessary for precipitation of the corresponding hydrated metal oxide on the flaky metal substrate (neutralization point);
(C) decreasing the pH value obtained in step (B) to a range of from 0.2 to 3.0 below the neutralization point of the corresponding hydrated metal oxide;
(D) adding an acidic solution of an organic color pigment to the suspension prepared in step (C), thereby producing an intermediate pigment having a colored surface layer; and
(E) adding an aqueous solution of a metal salt to the suspension prepared in step (D) while adjusting the pH value to a value necessary for precipitation of the corresponding hydrated metal oxide (neutralization point) on the colored surface layer of the intermediate pigment obtained in step (D).

According to the present invention, in step (A), the suspension is prepared by dispersing a flaky metal substrate in an aqueous solution disclosed in, for example, JP 3581339B and the like.

The flaky metal substrate is preferably chosen of the metals and metal alloys as described above, namely may be of flakes of aluminum, titanium, gold, silver, iron, copper, zinc, tin, nickel and chromium or of alloys containing them. In a particularly preferred embodiment of the present invention, the flaky metal substrate is of flakes of aluminium or aluminium alloy.

As already disclosed above, the flaky metal substrate can be precoated by one or more passivation layers as an anticorrosion treatment of the flaky metal substrate. Such passivated metal substrates are preferred, in particular when aluminium or aluminium alloys are used.

Preferably, as described in "the passivation layers" above, the one or more passivation layers may comprise a hydrated oxide, a phosphonic acid, an organic phosphoric acid, silica, volatile phosphorus compounds and volatile nitrogen containing organosilicon compounds, boric acid compounds or phosphoric acid compounds with one or more of hydrated metal oxide layers thereon, and a combination of any of these.

More preferably, said passivation treatment can be executed on the flaky metal substrate, especially on the aluminium flake or aluminium alloy flake, by boric acid compounds or phosphoric acid compounds with one or more hydrated metal oxide layers thereon. Even more preferred, orthophosphonic acid, metaphosphoric acid, tripolyphosphate, hypophosphorous acid or phosphorous acid can be used to form one or more of the passivation layers. Preferably, the treatment with boric acid compounds and/or phosphoric acid compounds is followed by applying a silica layer as a further passivation layer, as already explained above.

In a particularly preferred embodiment of the present invention, the flaky metal substrate is precoated, on top of the pure metal flake or on top of the passivation layer(s), as the case may be, with one or more layers of metal oxides and/or hydrated metal oxides to form metal substrates exhibiting interference effects, i.e. interference pigments based on metal substrates. These interference pigments may be preferably used as flaky metal substrate in accordance to the present invention.

The coating method for applying metal oxides and/or hydrated metal oxides to form interference layers onto the metal substrate is not particularly limited. General publically known methods can be used. For example, gas phase methods, sol-gel methods, wet process methods like described in JP 3581339B can be used preferably. In particular, due to the ease of the method, wet chemical methods are preferred.

More preferably, the flaky metal substrate can further be precoated by a hydrated tin oxide layer placed between the flaky metal substrate and the interference layer or placed between the one or more of the passivation layers and the interference layer, as explained earlier.

The pH of the aqueous suspension of the flaky metal substrate is then adjusted to a prescribed value by adding an acid or a base, as the case may be. This value is determined by the kind of metal salt added later on in step (B) and the expected hydrated metal oxide to be precipitated. For instance, the prescribed pH value for the precipitation of hydrated aluminium oxide, which is preferably used in the present invention, is about 6.0 (±0.2). For hydrated zinc oxide, the pH to be adjusted would be in the range of from 1.5 to 3.0, whereas it would be in the range of from 5.0 to 10.0 for hydrated zinc oxide. The related pH values are known to the person skilled in the art.

In step (B) of the process according to the present invention, an aqueous solution of a metal salt is added to the aqueous suspension of the flaky metal substrate obtained in step (A). As examples of the aqueous solution of the metal salt used in step (B), chlorides or sulfates of aluminum, zinc, calcium, magnesium, zirconium or cerium may be mentioned.

By adding an acid or a base (a proton donating or accepting substance), as the case may be, the prescribed pH value adjusted before is kept at the value which is necessary for precipitation of the corresponding hydrated metal oxide on the flaky metal substrate.

For the purpose of the present invention, this prescribed pH value is named the "neutralization point" of the corresponding hydrated metal oxide.

In step (B), while adding the dissolved metal salt, the pH value is kept at the neutralization point in order to have the hydrated metal oxide precipitated on the surface of the (optionally passivated and/or pre-coated) surface of the flaky metal substrate.

The pH may be kept by known compounds, e.g. sodium hydroxide or hydrochloric acid.

Thus, as a result of process step (B) of the present method, hydrated metal oxides of the elements selected from aluminum, zinc, calcium, magnesium, zirconium, or cerium form a layer of hydrated metal oxide on the surface of the flaky metal substrate. This layer corresponds to layer (a) as described with respect to the inventive pigments before. Preferably, merely one of the hydrated metal oxides mentioned above is present in this layer. Preferably, hydrated aluminium oxide, hydrated calcium oxide or hydrated magnesium oxide is present, of which hydrated aluminium oxide is particularly preferred.

According to the present invention, in step (C), the pH value of the suspension obtained in step (B) is decreased to a range of from 0.2 to 3.0 below the neutralization point of corresponding hydrated metal oxide. An acidic solution is used to decrease the pH value preferably.

The decrease of the pH value in step (C) corresponds to the "activation" of the hydrated metal oxide layer (a) which has already been described before. Without wishing to be bond by theory, it is believed that the acidic solution works to give away protons to the hydrates obtained in step (B) in order to form additional cations at least at the upper surface of layer (a) obtained in step (B), as described in following chemical formulae (a) to (e).

$$M(OH)_n + H^+ \rightarrow [M(OH)_{n-1}]^+(1) + H_2O \quad \text{Chemical formula (a)}$$

$$[M(OH)_{n-1}]^+ + H^+ \rightarrow [M(OH)_{n-2}]^{2+}(2) + H_2O \quad \text{Chemical formula (b)}$$

$$[M(OH)_{n-1}]^+ + H^+ \rightarrow [O=M(OH)_{n-4}]^{2+}(3) + 2H_2O \quad \text{Chemical formula (c)}$$

$$[M(OH)]^{(n-1)+} + H^+ \rightarrow M^{n+}(4) + H_2O \quad \text{Chemical formula (d)}$$

$$[M(OH)]^{(n-1)+} + H^+ \rightarrow [M(H_2O)]^{n+}(5) \quad \text{Chemical formula (e)}$$

Wherein the formulae (a) to (e), at each occurrence, the symbol M represents a metal element, identically or differently selected from the group consisting of aluminum, zinc, calcium, magnesium, zirconium or cerium; n is integer. As already disclosed above, aluminium, calcium or magnesium are preferred. From the viewpoint of ease of procurement availability of raw materials, aluminium is particularly preferred.

As the acidic solution, a highly acidic solution with an abundance of protons is preferred for forming one or more kinds of the metal cations described in the formulae (a) to (e) on the surface of hydrated oxides of layer (a). As examples of highly acidic solution, solution of hydrochloric acid, sulfuric acid, nitric acid, a combination of any of these and the like are particularly preferred.

From the viewpoint of ease of procurement availability of raw materials, solutions of hydrochloric acid, sulfuric acid, or a combination of any of these are mostly preferred.

According to the present invention, the organic color pigment used in step (D) of the present process is preferably a water insoluble organic color pigment. The type of water insoluble organic color pigment is not particularly limited but need to be dissolved in acid. Any type of publically known water insoluble but acid soluble organic pigment can be used in this way.

More preferably, the organic pigment can be selected from the group consisting of phthalocyanine (non-metalized phthalocyanine; C.I. Pigment Blue-16), a metal phthalocyanine, indigo compounds, anthradione compounds, and a combination of any of these.

Even more preferably, the organic pigment is phthalocyanine or a metal phthalocyanine compound, which can be selected from the group consisting of Cu-Phthalocyanine ($\alpha$, $\beta$, $\gamma$, $\delta$, $\epsilon$, $\rho$, $\pi$, $\chi$ crystal types or a combination of any of these), other metal phthalocyanine (Ni, Co, V, Al, Mg. Ba, Na, Zn or Sn phthalocyanines), or a Cu-phthalocyanine halide (such as Cl and/or Br substituted Cu-phthalocyanine halide) and a combination of any of these.

In general, the acidic solvent used in step (D) can be selected from publically known organic or inorganic acidic solvents.

According to the present invention, inorganic solvents, such as sulfuric acid, acetic acid, phosphoric acid, are preferable to dissolve organic color pigments. High concentration of the acid is preferred in order to fully dissolve the organic color pigment in the acid. Therefore, even more preferred, the inorganic solvent is a concentrated sulfuric acid aqueous solution.

According to the present invention, the term "concentrated" means over 90 wt % concentration of acid in aqueous solution. Preferably, it is in the range of 95 wt % to 100 wt %.

Thus, in some preferred embodiments of the present invention, phthalocyanine or a metal phthalocyanine compound as the organic color pigment is used dissolved in sulfuric acid in step (D).

In a preferred embodiment of the present invention, a solution having electron donating or accepting ability can be used in step (D) to maintain the pH value at the value adjusted in step (C). For instance, sodium hydroxide may be used in case that Cu-phthalocyanine blue is used as the organic color pigment, dissolved in concentrated sulfuric acid.

As a result of step (D) of the present process, an intermediate pigment is produced having a colored surface layer, the latter being essentially composed of the organic color pigment. Due to the use of an acidic solution of the organic color pigment, the organic color pigment layer on the surface of the intermediate pigment is formed as a dense, continuous layer completely surrounding the underlying layers, which could have never been achieved if only an aqueous dispersion of the organic color pigment would have been used in this step. The use of a color pigment solution enables the organic color pigment to homogeneously adhere to the surface of the activated underlying hydrated metal oxide layer. In addition, the activated sites on layer (a) seem to form ionic bonds with the acid groups still contained in the organic color pigment layer, in particular if sulfuric acid groups are present.

Finally, in order to prevent bleeding or other detrimental effects of the organic color pigment layer (b) formed in step (D), a further layer (layer (c)) is formed on top of layer (b) by further adding of an aqueous solution of a metal salt to the suspension obtained in step (D) in step (E). According to the present invention, aqueous solutions of metal salts of the elements aluminum, zinc, calcium, magnesium, zirconium, cerium and silicon are applied in step (E). According to the present invention, one or more types of these metal salts may be used together. Preferably, salts of aluminium, calcium and/or magnesium are used, aluminium salts being mostly preferred of these.

Since in step (E) hydrated metal oxides of the metals mentioned before shall be produced, similar to step (B), the neutralization point for the corresponding hydrated metal oxide must be adjusted in step (E) as well.

This is done by adding an acid or base, as the case may be, in order to adjust the pH at the value necessary for the precipitation of the corresponding hydrated metal oxide on the colored surface layer of the intermediate pigment obtained in step (D).

It is of advantage to keep the suspension in a well dispersed state in all production steps (A) through (E).

Preferably, in some embodiments of the present invention, the pigment achieved in step (E) is dried at a temperature in the range of from 100 to 200° C. In order to prevent formation of metal oxides instead of hydrated metal oxides, any calcination of the resulting pigments at temperatures higher than 400° C. should be prevented.

In some embodiments of the present invention, the manufacturing method can further comprise the following sequential steps (F) to (I) after step (E).
(F) Forming one or more protection layers
(G) Filtering the obtained suspension to separate the suspension into filtrate and filtered cake
(H) Washing the filtered cake
(I) Drying the filtered cake Preferably, in step (F), various well known inorganic and/or organic surface treatments can be performed to form a protection layer. Examples of surface protection with inorganic substances can include applying thin layers of hydrated silicon oxide, hydrated cerium oxide and the like, and examples of surface treatments with organic substances can include treatments with silane coupling agents and the like. These methods to form the protection layer(s) can be used in combination with each other. Actual treatment can be performed like described in U.S. Pat. No. 7,419,538 B2, to take only one example.

The other steps mentioned as (G) to (I) are very well known to the skilled person and do not need to be explained further.

In another aspect, the present invention also relates to the use of the inventive colored effect pigment for the coloring of paints, inks, plastic films, plastic shaped bodies, coating compositions, pigment preparations, anticounterfeiting products or cosmetics.

For the application of the paints, inks and coating compositions containing the colored effect pigments according to the present invention, the corresponding ink, paint or coating composition is applied onto the surface of a plastic, paper, wooden or metallic substrate in a commonly known manner.

In all application media, the present pigments may be used in a concentration useful for the actual technical application and very well known in the art. The pigments of the present invention may also be used in combination with further, different effect pigments and/or organic dyes or organic as well as inorganic colored pigments or functional pigments, if desired. No limitations except for those generated by the application media or application procedures used will apply here.

In yet another aspect, the present invention also relates to a composition comprising the colored effect pigment. The corresponding compositions are preferably those as already mentioned above, namely paints, inks, plastic films, plastic shaped bodies, coating compositions, pigment preparations, anticounterfeiting products or cosmetics.

The colored effect pigments according to the present invention exhibit mechanically and chemically stable color characteristics due to the color of the organic color pigments used and their encapsulation between two hydrated metal oxide layers. At the same time, they may also exhibit interference colors which are either same or different in comparison to the color generated by the organic color pigment layer. Due to this interaction, the present pigments provide either very strong uniform color characteristics or interesting color varying characteristics, according to the actual desire. They exhibit a good hiding power as well as a high gloss. In addition, the particulars of the preparation method thereof count for long lasting reliable color characteristics in varying application media.

The working examples 1 and 2 below provide a description of colored effect pigments of the present invention, as well as an in detail description of their fabrication.

Definition of Terms

According to the present invention, the term "inorganic" means any material not containing carbon atoms or any compound that containing carbon atoms ionically bond to other atoms such as carbon monoxide, carbon dioxide, carbonates, cyanides, cyanates, carbides, and thiocyanates.

Each feature disclosed in this specification, unless stated otherwise, may be replaced by alternative features serving the same, equivalent, or similar purpose. Thus, unless stated otherwise, each feature disclosed is but one example of a generic series of equivalent or similar features.

The invention is described in more detail in reference to the following examples, which are only illustrative and do not limit the scope of the invention.

EXAMPLES

Example 1: Fabrication of a Colored Effect Pigment with Copper Phthalocyanine Blue (a) Preparation of Interference Colored Al Pigments [Al(P)/$SiO_2$/$SnO_2$/$TiO_2$]

50 g of the highly anti-corrosive thin-platelet like metal pigments Al(P)/$SiO_2$ obtained according to JP 2003-041150 A are suspended in 1 liter of water and the obtained suspension is heated to 75° C. under stirring. 50 g of $SnCl_4 \cdot 5H_2O$ aqueous solution (concentration of 50 g/liter) are dropped into the suspension while keeping the pH value at 1.8 using 32 wt % of sodium hydroxide aqueous solution.

Then, titanium tetrachloride solution ($TiCl_4$, 403 g/liter) is dropped into the suspension until the desired hue is achieved while keeping the pH value at 1.8 using sodium hydroxide of 32 wt %.

Then, the solid parts in the suspension are filtered, washed with water, then dried and calcined. Finally, the interference colored pigments having metallic luster with blue color are obtained.

(b) Cu-Phthalocyanine Blue Coatings 100 g of obtained interference colored pigments ([Al(P)/$SiO_2$/$SnO_2$/$TiO_2$]) are suspended in 2 liter of water and the suspension is heated to 75° C. under stirring.

The pH value of the suspension is adjusted to 6.0 with 20 wt % aqueous hydrochloric acid solution. Then, 181 g of aqueous aluminum chloride hexahydrate solution (concentration: 4% by weight) is dropped into the suspension while the pH value is kept at 6.0 with 12 wt % aqueous sodium hydroxide solution. Then, the pH value of the suspension is decreased to 3.0 with an aqueous hydrochloric acid solution (20 wt %) while stirring for 30 minutes.

Then, the solution of 5 g Cu-Phthalocyanine Blue dissolved in 50 g of concentrated sulfuric acid is dropped to the above dispersed suspension, and the dispersed suspension is stirred for 30 minutes while the pH value is kept at 3.0 with 12 wt % aqueous sodium hydroxide solution.

Afterwards, 181 g aqueous aluminum chloride hexahydrate solution (concentration: 4% by weight) is dropped into the obtained suspension. After keeping it for 10 minutes, the pH value of the suspension is increased to 6.0 with 12 wt % of aqueous sodium hydroxide solution. The dispersed suspension is stirred for 30 minutes, and then filtered and the solid parts are washed with water and dried. Finally, the colored effect pigments having a blue color according to the present invention are obtained.

Example 2: Fabrication of a Colored Effect Pigment with Copper Phthalocyanine Blue (a). Preparation of Interference Colored Al Pigments [Al(P)/$SiO_2$/$SnO_2$/$TiO_2$/$Ce_2O_3$]

50 g of the highly anti-corrosive thin-platelet like metal pigments Al(P)/$SiO_2$ obtained according to JP 2003-041150 A are suspended in 1 liter of water and the obtained suspension is heated to 75° C. under stirring. 50 g of $SnCl_4 \cdot 5H_2O$ aqueous solution (concentration of 50 g/liter) are dropped into the suspension while keeping the pH value at 1.8 using 32 wt % of sodium hydroxide aqueous solution.

Then, titanium tetrachloride solution ($TiCl_4$, 403 g/liter) is dropped into the suspension until the desired hue is achieved while keeping the pH value at 1.8 using sodium hydroxide of 32 wt %.

Afterwards, the pH value is adjusted to 6.0 with 12 wt % aqueous sodium hydroxide solution. 23 g of aqueous cerium chloride solution ($CeCl_3$, 383 g/liter) is dropped into the suspension while the pH value is kept at 6.0 with 12 wt % aqueous sodium hydroxide solution.

Then, the solid parts in the suspension are filtered, washed with water, then dried and calcined. Finally, the interference colored pigments having metallic luster with blue color are obtained.

(b). Cu-Phthalocyanine Blue Coatings 100 g of obtained interference colored pigments ([Al(P)/$SiO_2$/$SnO_2$/$TiO_2$/$Ce_2O_3$]) are suspended in 2 liter of water and the suspension is heated to 75° C. under stirring.

The pH value of the suspension is adjusted to 6.0 with 20 wt % aqueous hydrochloric acid solution. Then, 181 g of aqueous aluminum chloride hexahydrate solution (concentration: 4% by weight) is dropped into the suspension while the pH value is kept at 6.0 with 12 wt % aqueous sodium hydroxide solution. Then, the pH value of the suspension is decreased to 3.0 with an aqueous hydrochloric acid solution (20 wt %) while stirring for 30 minutes.

Then, the solution of 10 g Cu-Phthalocyanine Blue dissolved in 100 g of concentrated sulfuric acid is dropped to the above dispersed suspension, and the dispersed suspension is stirred for 30 minutes while the pH value is kept at 3.0 with 12 wt % aqueous sodium hydroxide solution.

Afterwards, 181 g aqueous aluminum chloride hexahydrate solution (concentration: 4% by weight) is dropped into the obtained suspension. After keeping it for 10 minutes, the pH value of the suspension is increased to 6.0 with 12 wt % of aqueous sodium hydroxide solution. The dispersed suspension is stirred for 30 minutes, and then filtered and the solid parts are washed with water and dried. Finally, the colored effect pigments having a blue color according to the present invention are obtained.

Comparative Example 1: Fabrication of Interference Colored Al Pigments [Al(P)/$SiO_2$/$SnO_2$/$TiO_2$]

As a comparative example, interference colored Al pigments ([Al(P)/$SiO_2$/$SnO_2$/$TiO_2$]) are fabricated in the same manner as described in example 1, (a), Preparation of interference colored Al pigments [Al(P)/$SiO_2$/$SnO_2$/$TiO_2$], except that part (b), namely the application of Cu-Phthalocyanine Blue coatings, is not carried out.

Interference colored Al pigments ([Al(P)/$SiO_2$/$SnO_2$/$TiO_2$]) having a blue interference color are obtained.

Comparative Example 2: Fabrication of a Colored Effect Pigment with Copper Phthalocyanine Blue Without Acid Treatment 100 g of interference colored pigments ([Al(P)/$SiO_2$/$SnO_2$/$TiO_2$]) obtained in the same manner as described in working example 1, are suspended in 2 liter of water and the suspension is heated to 75° C. under stirring.

The pH value of the suspension is adjusted to 6.0 with 20 wt % aqueous hydrochloric acid solution. Then, 181 g of aqueous aluminum chloride hexahydrate solution (concentration: 4% by weight) is dropped into the suspension while the pH value is kept at 6.0 with 12 wt % aqueous sodium hydroxide solution.

After dropping, the pH value is kept at 6.0 and the suspension is stirred for 30 minutes.

Then, a solution of 5 g Cu-Phthalocyanine Blue dissolved in 50 g of concentrated sulfuric acid is dropped to the above suspension, and the suspension is stirred for 30 minutes while the pH value is kept at 6.0 with 12 wt % aqueous sodium hydroxide solution.

Afterwards, 181 g aqueous aluminium chloride hexahydrate solution (concentration: 4% by weight) is dropped to it. After keeping it for 10 minutes, the pH value is again adjusted at 6.0 with 12 wt % aqueous sodium hydroxide solution, and the suspension is stirred for 30 minutes, and then filtered and the solid parts are washed with water and dried.

Finally, comparative colored effect pigments having a blue color are obtained.

Comparative Example 3: Fabrication of a Colored Effect Pigment with Copper Phthalocyanine Blue Without Primer Layer 100 g of interference colored pigments ([Al(P)/$SiO_2$/$SnO_2$/$TiO_2$]) obtained in the same manner as described in working example 1, are suspended in 2 liter of water and the suspension is heated to 75° C. under stirring.

The pH value of the suspension is adjusted to 3.0 with 20 wt % of aqueous hydrochloric acid solution and the suspension is stirred for 30 minutes.

Then, the solution of 5 g Cu-Phthalocyanine Blue dissolved in 50 g of concentrated sulfuric acid is dropped to the above suspension, and the suspension is stirred for 30 minutes while the pH value is kept at 3.0 with 12 wt % aqueous sodium hydroxide solution.

Afterwards, 181 g aqueous aluminum chloride hexahydrate solution (concentration: 4% by weight) is dropped into the obtained suspension. After keeping it for 10 minutes, the pH value of the suspension is increased to 6.0 with 12 wt % of aqueous sodium hydroxide solution. The suspension is stirred for 30 minutes, and then filtered and washed with water and dried.

Finally, comparative colored effect pigments having a blue color are obtained.

Color Evaluation 0.9 weight parts of the colored effect pigments obtained in Example 1 is dispersed in 53.6 weight parts of an acryl-modified nitrocellulose lacquer and coated onto a black and white paper with an applicator (bar coater #20). After drying, color is measured with using Minolta Chroma Meter CR-300 (manufactured by Minolta Co., Ltd.) with the condition of I (Incidence)/R (reflection)=45/0 Black.

Then, color evaluation of interference colored Al pigments ([Al(P)/$SiO_2$/$SnO_2$/$TiO_2$]) obtained in the comparative example 1 is carried out in the same manner as described above, except for the interference colored Al pigments are used instead of the colored effect pigments of example 1.

Color evaluation of the colored effect pigments obtained in the comparative example 3 is carried out in the same manner as described above, except for the colored effect pigments from the comparative example 3 are used instead of the colored effect pigments of example 1. FIG. 1 shows color evaluation results of examples 1 and 2 and comparative examples 1 and 3 in the same FIGURE. As a result, it is clearly shown that the chroma of the colored effect pigments according to the present invention is much higher than that of the pigments according to the comparative examples.

The invention claimed is:

1. A colored effect pigment, comprising a flaky metal substrate and at least three layers covering the flaky metal substrate, wherein the at least three layers comprise a layer package composed of layers a, b and c in the following sequence:
   (a) a hydrated metal oxide primer layer comprising a hydrated metal oxide, wherein layer (a) consists of a sublayer (a1) and a sublayer (a2), wherein sublayer (a1) is closest to the flaky metal substrate and consists of one or more hydrated metal oxides, and wherein sublayer (a2) is between sublayer (a1) and layer (b) and is composed of a mixture of a hydrated metal oxide and an organic color pigment of organic color pigment layer (b),
   (b) an organic color pigment layer on layer (a) consisting of one or more organic color pigments and optionally acid groups, and
   (c) a hydrated metal oxide layer on layer (b) comprising a hydrated metal oxide.

2. The colored effect pigment according to claim 1, wherein layer (a) comprises a hydrated metal oxide of an element selected from the group consisting of aluminum, zinc, calcium, magnesium, zirconium and cerium.

3. The colored effect pigment according to claim 1, wherein the total thickness of layer (a) is in the range of 1 to 50 nm.

4. The colored effect pigment according to claim 1, wherein the amount of hydrated metal oxide, calculated as metal oxide, in layer (a) is from 0.1 to 20 percent by weight, based on the weight of the flaky metal substrate.

5. The colored effect pigment according to claim 1, wherein the organic color pigment contained in layer (b) is insoluble in water.

6. The colored effect pigment according to claim 1, wherein the organic color pigment contained in layer (b) is phthalocyanine, a metal phthalocyanine compound, an indigo compound or an anthradione compound.

7. The colored effect pigment according to claim 1, wherein the thickness of layer (b) is in the range of 1 to 500 nm.

8. The colored effect pigment according to claim 1, wherein the amount of organic color pigment in layer (b) is from 0.1 to 100 percent, based on the weight of the flaky metal substrate.

9. The colored effect pigment according to claim 1, wherein layer (c) comprises at least one hydrated metal oxide of an element selected from the group consisting of aluminum, zinc, calcium, magnesium, zirconium, cerium and silicon.

10. The colored effect pigment according to claim 1, wherein at least one protective layer (d) is located on top of layer (c).

11. The colored effect pigment according to claim 1, wherein the flaky metal substrate comprises at least one metal or alloy selected from the group consisting of aluminum, titanium, gold, silver, iron, copper, zinc, tin, nickel and chromium.

12. The colored effect pigment according to claim 11, wherein the metal alloy is a stainless steel.

13. The colored effect pigment according to claim 1, wherein the flaky metal substrate is of aluminum or aluminum alloy.

14. The colored effect pigment according to claim 1, wherein the flaky metal substrate is passivated by one or more passivation layers.

15. The colored effect pigment according to claim 1, wherein the flaky metal substrate is pre-coated with at least one interference layer.

16. The colored effect pigment according to claim 15, wherein the interference layer comprises at least one oxide or hydrated oxide of an element selected from the group consisting of titanium, iron, aluminum, zirconium, cerium, zinc, chromium, cobalt, tin, silicon and boron.

17. A manufacturing method for the colored effect pigment according to claim 1, comprising the following steps:
(A) providing a suspension of a flaky metal substrate, optionally coated with one or more passivation layers and/or with at least one interference layer, in an aqueous medium;
(B) adding an aqueous solution of a metal salt to the suspension prepared in step (A) while keeping a prescribed pH value at a value necessary for precipitation of the corresponding hydrated metal oxide on the flaky metal substrate (neutralization point);
(C) decreasing the pH value obtained in step (B) to a range of from 0.2 to 3.0 below the neutralization point of the corresponding hydrated metal oxide;
(D) adding an acidic solution of an organic color pigment to the suspension prepared in step (C), thereby producing an intermediate pigment having a colored surface layer; and
(E) adding an aqueous solution of a metal salt to the suspension prepared in step (D) while adjusting the pH value to a value necessary for precipitation of the corresponding hydrated metal oxide (neutralization point) on the colored surface layer of the intermediate pigment obtained in step (D).

18. The manufacturing method for the colored effect pigment according to claim 17, wherein the pigment achieved in step (E) is dried at a temperature in the range of from 100 to 200° C.

19. The manufacturing method for the colored effect pigment according to claim 17, wherein the acidic organic color pigment solution is an acidic solution of phthalocyanine, a metal phthalocyanine compound, an indigo compound or an anthradione compound.

20. The manufacturing method for the colored effect pigment according to claim 19, wherein the acidic organic color pigment solution is a sulfuric acid solution of phthalocyanine or of a metal phthalocyanine compound.

21. The manufacturing method for the colored effect pigment according to claim 17, wherein the hydrated metal oxide in step (B) comprises a hydrated metal oxide of the elements selected from the group consisting of aluminum, zinc, calcium, magnesium, zirconium, or cerium.

22. The manufacturing method for the colored effect pigment according to claim 17, wherein the hydrated metal oxide of the elements in step (E) comprises at least one type of hydrated oxides of the elements selected from the group consisting of aluminum, zinc, calcium, magnesium, zirconium, cerium and silicon.

23. A composition comprising the colored effect pigment according to claim 1.

24. A composition according to claim 23, which is a paint, ink, plastic film, plastic shaped body, coating, pigment, anticounterfeiting product or cosmetic composition.

25. An article which comprises a composition according to claim 24, which is an ink, paint or coating composition, applied onto the surface of a plastic, paper, wooden or metallic substrate.

26. A method for the coloring of a paint, ink, plastic film, plastic shaped body, coating, pigment, anticounterfeiting product or cosmetic composition, which comprises incorporating a colored effect pigment according to claim 1 into the composition.

27. A method according to claim 26, wherein the composition is an ink, paint or coating composition, and the method further comprises applying the ink, paint or coating composition onto the surface of a plastic, paper, wooden or metallic substrate.

28. The colored effect pigment according to claim 1, wherein sublayer (a1) consists of one hydrated metal oxide.

* * * * *